US011731997B2

(12) United States Patent
Qin et al.

(10) Patent No.: US 11,731,997 B2
(45) Date of Patent: Aug. 22, 2023

(54) METHOD FOR PREPARING AMPHIPHILIC LIGNIN NANOMATERIAL BASED ON PULPING BLACK LIQUOR, AMPHIPHILIC LIGNIN NANOMATERIAL, AND OIL SLUDGE DETERGENT

(71) Applicant: Guangxi University, Nanning (CN)

(72) Inventors: Chengrong Qin, Nanning (CN); Jian Zhang, Nanning (CN); Chen Liang, Nanning (CN); Shuangquan Yao, Nanning (CN); Xinliang Liu, Nanning (CN); Zhiwei Wang, Nanning (CN); Wei Li, Nanning (CN); Jiulong Sha, Nanning (CN)

(73) Assignee: GUANGXI UNIVERSITY, Nanning (CN)

( * ) Notice: Subject to any disclaimer, the term of this patent is extended or adjusted under 35 U.S.C. 154(b) by 484 days.

(21) Appl. No.: 17/095,297

(22) Filed: Nov. 11, 2020

(65) Prior Publication Data

US 2022/0144874 A1 May 12, 2022

(51) Int. Cl.
C07G 1/00 (2011.01)
B02C 17/18 (2006.01)
C11D 11/00 (2006.01)
C11D 3/38 (2006.01)
B01F 23/50 (2022.01)
B82Y 30/00 (2011.01)
B82Y 40/00 (2011.01)

(52) U.S. Cl.
CPC .............. C07G 1/00 (2013.01); B01F 23/511 (2022.01); B01F 23/54 (2022.01); B01F 23/59 (2022.01); B02C 17/18 (2013.01); C11D 3/38 (2013.01); C11D 11/0052 (2013.01); B01F 23/58 (2022.01); B82Y 30/00 (2013.01); B82Y 40/00 (2013.01)

(58) Field of Classification Search
CPC ......... C07G 1/00; B02C 17/18; B01F 3/1271; B01F 3/1214; B01F 3/1228; B82Y 30/00; C11D 11/0052; C11D 3/38
USPC ....................................................... 524/799
See application file for complete search history.

Primary Examiner — Hui H Chin
(74) Attorney, Agent, or Firm — Flener IP & Business Law; Zareefa B. Flener

(57) ABSTRACT

The disclosure provides a method for preparing an amphiphilic lignin nanomaterial based on pulping black liquor, an amphiphilic lignin nanomaterial, and an oil sludge detergent. In the disclosure, physical treatments such as ball milling and high-pressure jet homogenization treatment are conducted on alkali lignin at the early stage to adjust the molecular weight and size of alkali lignin and thus to give alkali lignin nanoparticles with uniform particle sizes; and on this basis, a chemical treatment such as alkylation grafting modification is conducted to give amphiphilic lignin nanoparticles with both hydrophilicity and lipophilicity. Due to the nano-size effect, the amphiphilic lignin nanomaterial has a significantly-increased specific surface area (SSA) and effectively-improved surface properties, which can reduce the oil-water interfacial tension, and emulsify the crude oil and peel off the crude oil from the surface of rock particles, so as to achieve the purpose of oil-solid separation.

20 Claims, No Drawings

METHOD FOR PREPARING AMPHIPHILIC LIGNIN NANOMATERIAL BASED ON PULPING BLACK LIQUOR, AMPHIPHILIC LIGNIN NANOMATERIAL, AND OIL SLUDGE DETERGENT

TECHNICAL FIELD

The disclosure relates to the technical field of chemical deoiling in the petroleum industry, and in particular to a method for preparing an amphiphilic lignin nanomaterial based on pulping black liquor, an amphiphilic lignin nanomaterial, and an oil sludge detergent.

BACKGROUND

As an important resource, petroleum plays a pillar role in the development of the national economy. In the past three years, crude oil output in China has hit a string of new highs to 194 million tons per year, which plays a vital role in safeguarding the security of national energy and promoting the sustainable development of industrial economy. However, the environmental pollution caused during the development and use of petroleum resources is also a problem that cannot be ignored. For example, nearly 4 million tons of oil sludge produced during the petroleum exploration and processing includes hundreds of toxic and harmful compounds, where, some polycyclic aromatic hydrocarbons (PAHs) and heavy metal ions exhibit carcinogenic, teratogenic and mutagenic effects. Therefore, if the oil sludge cannot be properly treated, it will cause irreparable harm to the natural environment and humans.

At present, oil sludge treatment technologies mainly include pyrolysis absorption, hot washing, supercritical water oxidation (SCWO), conditioning-centrifugation, solvent extraction, electrochemical treatment, biological treatment, etc. The hot washing method mainly uses a hot aqueous alkaline solution or a hot aqueous solution including a suitable concentration of surfactant to wash the oil sludge multiple times, and then realizes the three-phase separation of oil, water and mud through air flotation, swirling or other processes, which is suitable for the treatment of a variety of oil sludges and exhibits a relatively-ideal deoiling effect. The hot washing method can achieve the reduction and continuous treatment of oil sludge, is easy to operate, and has a low cost. When the oil sludge is mixed with the hot aqueous solution including a surfactant, the high surface activation energy of the surfactant can significantly reduce the interfacial tension at the interface of oil and water, reduce the viscous resistance of the crude oil, and allow the crude oil to be easily peeled and to flow. In addition, the surfactant has a strong ability to emulsify crude oil and change the wettability of the sediment surface. Under the action of a low surface tension, oil droplets are easily deformed, which accelerates the movement through the pores and reduces the energy required by the separation via pores, thereby significantly improving the oil elution effect of the hot washing.

With excellent properties such as large specific surface area (SSA), high surface reactivity, and strong adsorption capacity, nanomaterials are widely used in the petroleum industry. For example, Li et al. added a certain amount of hydrophilic $Fe_3O_4$ nanoparticles during the flotation and extraction of Canadian oil sands to improve the wettability of the mineral surface and reduce the asphalt-water interfacial tension, making the asphalt recovery rate increase by 12%. Li et al. conducted modification on biomass macromolecular nanocellulose to give amphiphilic nanocellulose, which can be wedgedly adsorbed on the surface of the rock to peel off the oil film, change the wettability of the surface, emulsify the crude oil to form an O/W emulsion, and improve the flowability of the fluid. It indicated that nanomaterials have promising application prospects in oil/sludge separation.

Lignin is the most abundant natural aromatic compound in the nature, with an annual output of about 150 billion tons. In the pulping and paper-making process alone, about 50 million tons of lignin by-products such as lignosulfonate and alkali lignin are recycled and burned or used in value-added products every year. Alkali lignin well retains the chemical structure of natural lignin, and can be dissolved in an organic solvent or a strongly-alkaline aqueous solution. The hydrophobic backbone of the phenylpropane structural unit exhibits hydrophobicity, while some weakly ionized groups including phenolic hydroxyl exhibit a certain degree of hydrophilicity, which allows the alkali lignin to exhibit amphiphilic properties to a certain extent and have the potential to be used as a surfactant.

In the prior art, during the utilization of lignin in pulping black liquor, a modifier is usually added directly to the pulping black liquor to modify the lignin in the pulping black liquor, and then the mixture solution including modified lignin is finally used. However, in addition to lignin, the pulping black liquor includes other substances, and the presence of these substances will directly impact the performance of modified lignin, making the pulping black liquor inefficient when applied to deoiling.

SUMMARY

In view of this, the disclosure is intended to provide a method for preparing an amphiphilic lignin nanomaterial based on pulping black liquor, an amphiphilic lignin nanomaterial, and an oil sludge detergent. In the disclosure, alkali lignin is directly purified from pulping black liquor for modification, which increases the utilization of the pulping black liquor; and subsequently, the alkali lignin is modified, and the obtained amphiphilic lignin nanomaterial is compounded with other substances to give an oil sludge detergent with a high deoiling rate.

To achieve the above purpose, the disclosure provides the following technical solutions.

A method for preparing an amphiphilic lignin nanomaterial based on pulping black liquor includes the following steps:

subjecting pulping black liquor to acid precipitation, solid-liquid separation and ball milling to give alkali lignin particles;

mixing the alkali lignin particles, a hydrogen peroxide solution and water to give an activation treatment solution; and subjecting the activation treatment solution sequentially to activation treatment and microjet homogenization treatment to give activated alkali lignin nanoparticles;

mixing the activated alkali lignin nanoparticles, $Na_2SO_3$, HCHO and deionized water to give a sulfonation treatment solution, and subjecting the sulfonation treatment solution to sulfomethylation modification to give hydrophilic lignosulfonate nanoparticles; and mixing the hydrophilic lignosulfonate nanoparticles, long-chain alkylene oxide and i-propanol to give a chemical grafting treatment solution, and subjecting the chemical grafting treatment solution to chemical grafting to give an amphiphilic lignin nanomaterial.

Preferably, the pH for the acid precipitation is 2 to 3.

Preferably, the ball milling is conducted under the following parameters: volume fraction of filler in the ball milling tank: 20% to 25%; ball-to-material ratio: (3-6):1; rotational speed: 400 r/min to 500 r/min; and ball milling time: 4 h to 8 h.

Preferably, in the activation treatment solution, the alkali lignin particles have a mass concentration of 5 g/L to 10 g/L; the hydrogen peroxide solution with a mass concentration of 30% has a volume fraction of 0.2% to 0.5%; and the activation treatment is conducted at 55° C. to 65° C. for 0.2 h to 1 h.

Preferably, the microjet homogenization treatment is conducted under pressure of 30 MPa to 50 MPa.

Preferably, in the sulfonation treatment solution, $Na_2SO_3$ has a mass fraction of 0.1% to 0.4%; HCHO has a volume fraction of 0.2% to 0.5%; the activated alkali lignin nanoparticles have a mass concentration of 10 g/L; and the sulfomethylation modification is conducted at 70° C. to 120° C. for 1 h to 4 h.

Preferably, in the chemical grafting treatment solution, the hydrophilic lignosulfonate nanoparticles have a mass concentration of 10 g/L; the long-chain alkylene oxide has a volume fraction of 0.2% to 1.0%; and the long-chain alkylene oxide is 2-epoxypropyl dodecyl dimethyl ammonium chloride or 3-chloro-2-hydroxypropyl dimethyl octadecyl ammonium chloride.

Preferably, the chemical grafting is conducted at 50° C. to 60° C. for 1 h to 2 h, with a pH of 10 to 12.

The disclosure further provides an amphiphilic lignin nanomaterial obtained by the above method, where the amphiphilic lignin nanomaterial has a particle size of 20 nm to 100 nm.

The disclosure further provides an oil sludge detergent, including the following components, in mass percentage: 1% to 5% of the above amphiphilic lignin nanomaterial, 0.2% to 2% of surfactant, 1% to 1.2% of inorganic salt, and the balance of water, where, the surfactant is octylphenol polyoxyethylene ether and/or nonylphenol polyoxyethylene ether; and the inorganic salt includes one or more of sodium chloride, sodium carbonate and magnesium chloride.

The disclosure provides a method for preparing an amphiphilic lignin nanomaterial based on pulping black liquor, including the following steps: subjecting pulping black liquor to acid precipitation, solid-liquid separation and ball milling to give alkali lignin particles; mixing the alkali lignin particles, a hydrogen peroxide solution and water to give an activation treatment solution, and subjecting the activation treatment solution sequentially to activation treatment and microjet homogenization treatment to give activated alkali lignin nanoparticles; mixing the activated alkali lignin nanoparticles, $Na_2SO_3$, HCHO and deionized water to give a sulfonation treatment solution, and subjecting the sulfonation treatment solution to sulfomethylation modification to give hydrophilic lignosulfonate nanoparticles; and mixing the hydrophilic lignosulfonate nanoparticles, long-chain alkylene oxide and i-propanol to give a chemical grafting treatment solution, and subjecting the chemical grafting treatment solution to chemical grafting to give an amphiphilic lignin nanomaterial.

In the disclosure, physical treatments such as ball milling and high-pressure jet homogenization treatment are conducted on lignin in the pulping black liquor at the early stage to adjust the molecular weight and size of alkali lignin and thus to give activated alkali lignin nanoparticles with uniform particle sizes. Due to the nano-size effect, the amphiphilic lignin nanomaterial has a significantly-increased SSA and effectively-improved surface properties, which can reduce the oil-water interfacial tension, and emulsify the crude oil and peel off the crude oil from the surface of rock particles, so as to achieve the purpose of oil-solid separation. Moreover, the introduction of the amphiphilic lignin nanomaterial can also improve the wettability of the surface of rock particles and thus make the surface of rock particles change from lipophilic to hydrophilic, which is more conducive to the separation of crude oil.

The disclosure also provides an amphiphilic lignin nanomaterial obtained by the method described in the above technical solution. In the disclosure, alkali lignin in the pulping black liquor is extracted through the above method and then subjected to sulfonation and chemical grafting, where, hydrophilic and lipophilic groups are grafted on the alkali lignin to make the final amphiphilic lignin nanomaterial amphiphilic, which can efficiently deoil when used in an oil sludge detergent.

The disclosure also provides an oil sludge detergent, which adopts the amphiphilic lignin nanomaterial provided in the above technical solution, in combination with octylphenol polyoxyethylene ether and/or nonylphenol polyoxyethylene ether, to improve the deoiling rate of the detergent for oil sludge.

DETAILED DESCRIPTION

The disclosure provides a method for preparing an amphiphilic lignin nanomaterial based on pulping black liquor, including the following steps:

subjecting pulping black liquor to acid precipitation, solid-liquid separation and ball milling to give alkali lignin particles;

mixing the alkali lignin particles, a hydrogen peroxide solution and water to give an activation treatment solution; and subjecting the activation treatment solution sequentially to activation treatment and microjet homogenization treatment to give activated alkali lignin nanoparticles;

mixing the activated alkali lignin nanoparticles, $Na_2SO_3$, HCHO and deionized water to give a sulfonation treatment solution, and subjecting the sulfonation treatment solution to sulfomethylation modification to give hydrophilic lignosulfonate nanoparticles; and mixing the hydrophilic lignosulfonate nanoparticles, long-chain alkylene oxide and i-propanol to give a chemical grafting treatment solution, and subjecting the chemical grafting treatment solution to chemical grafting to give an amphiphilic lignin nanomaterial.

The pulping black liquor in the disclosure is subjected to acid precipitation, solid-liquid separation and ball milling to give alkali lignin particles.

In the disclosure, the pulping black liquor is preferably derived from caustic soda pulping, and the solid matters in the pulping black liquor preferably include the following substances, in mass percentage: 20% to 30% of alkali lignin, 35% to 50% of organic matter, 30% to 35% of inorganic matter. The organic matter preferably includes cellulose, hemicellulose, organic acid or pigment.

In the disclosure, the pH for the acid precipitation is preferably 2 to 3, and more preferably 2.5; and the reagent used for the acid precipitation is preferably an inorganic acid. The disclosure has no special limitation on the specific type, concentration and addition amount of the inorganic acid, provided that the pH of the pulping black liquor can be adjusted to 2 to 3.

In the disclosure, after the acid precipitation, the obtained mixture solution is preferably aged, and the aging is conducted preferably at room temperature preferably for 1 h to 3 h. In the disclosure, the alkali lignin in the pulping black liquor can be purified and separated by the acid precipitation to effectively improve the deoiling efficiency of the amphiphilic lignin.

In the disclosure, the solid-liquid separation is preferably centrifugation, and the centrifugation is conducted preferably at 4,000 r/min preferably for 20 min.

After the solid-liquid separation, the disclosure preferably includes washing the obtained solid, and the washing is conducted preferably 3 to 6 times preferably with water.

In the disclosure, after the washing, the washed product is preferably dried. The disclosure has no special limitation on the drying parameters, provided that all water can be removed.

In the disclosure, the ball milling is conducted under the following parameters: volume fraction of filler in the ball milling tank: preferably 20% to 25%, and more preferably 22% to 23%; ball-to-material ratio: preferably (3-6):1, and more preferably (4-5):1; rotational speed: preferably 400 r/min to 500 r/min; and ball milling time: preferably 4 h to 8 h. In the disclosure, after the ball milling, the alkali lignin particles have a particle size preferably of 10 μm to 80 μm. In the disclosure, the ball milling can reduce the particle size of alkali lignin, which is convenient for the subsequent microjet homogenization treatment.

In the disclosure, after the alkali lignin particles are obtained, the alkali lignin particles, a hydrogen peroxide solution and water are mixed to give an activation treatment solution, and the activation treatment solution is subjected sequentially to activation treatment and microjet homogenization treatment to give activated alkali lignin nanoparticles.

In the disclosure, in the activation treatment solution, the alkali lignin particles have a mass concentration preferably of 5 g/L to 10 g/L; and the hydrogen peroxide solution has a volume fraction preferably of 0.2% to 0.5%, and more preferably of 0.3% to 0.4%, and the hydrogen peroxide solution has a mass concentration preferably of 30%. In the disclosure, the activation treatment is conducted preferably for 0.2 h to 1 h preferably at 55° C. to 65° C. In the disclosure, the activation can reduce the molecular weight of alkali lignin particles, increase the number of phenolic hydroxyls, and improve the reactivity of alkali lignin in the subsequent chemical grafting modification.

In the disclosure, after the activation treatment is completed, the material obtained from the activation treatment is preferably directly subjected to microjet homogenization treatment.

In the disclosure, the microjet homogenization treatment is conducted preferably in a high-pressure microjet homogenizer; and the microjet homogenization treatment is conducted under a pressure preferably of 30 MPa to 50 MPa, and more preferably of 40 MPa. In the disclosure, the material obtained from the activation treatment is preferably circulated and homogenized 6 to 8 times in a high-pressure microjet homogenizer. The disclosure subjects the activated alkali lignin particles to nanocrystallization using high-shear, high-energy collision (turbulent collision), cavitation effect and other action forces of the high-pressure microjet, which can further reduce the particle size of the alkali lignin to give nanoscale and evenly-dispersed activated alkali lignin nanoparticles.

In the disclosure, the activated alkali lignin nanoparticles have a diameter preferably of 20 nm to 100 nm, and a weight average molecular weight (WAMW) preferably of 1,000 to 3,000.

In the disclosure, after the activated alkali lignin nanoparticles are obtained, the activated alkali lignin nanoparticles, $Na_2SO_3$, HCHO and deionized water are mixed to give a sulfonation treatment solution, and then the sulfonation treatment solution is subjected to sulfomethylation modification to give hydrophilic lignosulfonate nanoparticles.

In the disclosure, in the sulfonation treatment solution, $Na_2SO_3$ has a mass fraction preferably of 0.1% to 0.4%, and more preferably of 0.2% to 0.3%; HCHO has a volume fraction preferably of 0.2% to 0.5%, and more preferably of 0.3% to 0.4%; and the activated alkali lignin nanoparticles have a mass concentration preferably of 10 g/L. In the disclosure, the sulfomethylation modification is conducted preferably for 1 h to 4 h preferably at 70° C. to 120° C.

After the sulfonation treatment solution is subjected to sulfomethylation modification, the disclosure preferably includes subjecting the obtained reaction solution to post-treatment, and the post-treatment preferably includes the following steps: centrifuging the obtained reaction solution at 4,000 r/min for 20 min to remove insoluble substance; adjusting the pH of the solution to 2 to 3 to precipitate lignin; and subjecting the mixture solution to vacuum filtration, and then drying the obtained filter cake at a constant temperature of 50° C. to give hydrophilic lignosulfonate nanoparticles.

In the disclosure, the obtained hydrophilic lignosulfonate nanoparticles have a sulfonyl content preferably of 1.20 mmol/g to 2.40 mmol/g.

In the disclosure, the sulfomethylation modification can introduce hydrophilic sulfonyl groups into the structural unit of lignin benzene ring, thereby endowing lignosulfonate nanoparticles with a certain degree of hydrophilicity.

In the disclosure, after hydrophilic lignosulfonate nanoparticles are obtained, the hydrophilic lignosulfonate nanoparticles, long-chain alkylene oxide and i-propanol are mixed to give a chemical grafting treatment solution, and then the chemical grafting treatment solution is subjected to chemical grafting to give an amphiphilic lignin nanomaterial.

In the disclosure, in the chemical grafting treatment solution, the hydrophilic lignosulfonate nanoparticles have a mass concentration preferably of 10 g/L; the long-chain alkylene oxide has a volume fraction preferably of 0.2% to 1.0%, more preferably of 0.3% to 0.9%, and further more preferably of 0.4% to 0.8%; and the long-chain alkylene oxide is preferably 2-epoxypropyl dodecyl dimethyl ammonium chloride or 3-chloro-2-hydroxypropyl dimethyl octadecyl ammonium chloride.

In the disclosure, the chemical grafting is conducted preferably for 1 h to 2 h preferably at 50° C. to 60° C., with a pH preferably of 10 to 12. In the disclosure, the reagent used for adjusting the pH for the chemical grafting is preferably a NaOH solution with a mass fraction of 20%.

In the disclosure, the chemical grafting is preferably conducted in a microwave synthesizer.

In the disclosure, after the chemical grafting is completed, the obtained mixture is preferably subjected to dialysis and lyophilization; the molecular weight cut-off (MWCO) for the dialysis is preferably 1,000 Da; and the lyophilization is conducted preferably for 24 h preferably at −50° C.

In the disclosure, the chemical grafting can impart a certain degree of lipophilicity to the hydrophilic lignosulfonate nanoparticles.

The disclosure also provides an amphiphilic lignin nanomaterial obtained by the method described in the above technical solution, and the amphiphilic lignin nanomaterial has a particle size of 20 nm to 100 nm.

The disclosure also provides an oil sludge detergent, including the following components, in mass percentage: 1% to 5% of the amphiphilic lignin nanomaterial according to the above technical solution, 0.2% to 2% of surfactant, 1% to 1.2% of inorganic salt, and the balance of water. The surfactant is octylphenol polyoxyethylene ether and/or nonylphenol polyoxyethylene ether; and the inorganic salt includes one or more of sodium chloride, sodium carbonate and magnesium chloride.

The oil sludge detergent provided by the disclosure includes the amphiphilic lignin nanomaterial according to the above technical solution that has a mass percentage of 1% to 5%, preferably of 2% to 4%, and more preferably of 3%.

The oil sludge detergent provided by the disclosure includes a surfactant that has a mass percentage of 0.2% to 2%, and preferably of 1.0% to 1.5%; and the surfactant is octylphenol polyoxyethylene ether and/or nonylphenol polyoxyethylene ether.

The oil sludge detergent provided by the disclosure includes an inorganic salt that has a mass percentage of 1.0% to 1.2%, and preferably of 1.1%; and the inorganic salt preferably includes one or more of sodium chloride, sodium carbonate, and magnesium chloride.

The disclosure has no special limitation on the preparation method of the oil sludge detergent, and a mixture preparation method well known to those skilled in the art may be adopted.

In order to further describe the disclosure, the method for preparing an amphiphilic lignin nanomaterial based on pulping black liquor, the amphiphilic lignin nanomaterial, and the oil sludge detergent provided by the disclosure will be described below in detail with reference to examples. However, these examples should not be understood as limiting the claimed scope of the disclosure.

Example 1

Hydrochloric acid or sulfuric acid was added to the bagasse soda pulping black liquor under stirring to adjust the pH of the solution to 3, and the resulting mixture was aged for 2 h and then centrifuged at 4,000 r/min for 20 min; the obtained solid was washed with water to neutral and then dried at 40° C.; and the dried solid was subjected to ball milling in a planetary ball mill to give alkali lignin particles with a particle size of 80 The ball milling was conducted under the following parameters: volume fraction of filler in the ball milling tank: 25%; rotational speed of the ball mill: 400 r/min; ball milling time: 4 h; and ball-to-material ratio: 3:1.

The alkali lignin particles, a hydrogen peroxide solution (with a mass concentration of 30%) and deionized water were mixed to give an activation treatment solution; and the activation treatment solution was activated at 55° C. for 0.2 h, and then homogenized 6 times in a high-pressure microjet homogenizer under a pressure of 30 MPa to give activated alkali lignin nanoparticles with a diameter of 100 nm and a molecular weight of 3,000. In the activation treatment solution, the alkali lignin particles had a mass concentration of 10 g/L, and the hydrogen peroxide solution had a volume fraction of 0.2%.

The activated alkali lignin nanoparticles, $Na_2SO_3$, HCHO, and deionized water were mixed to give a sulfonation treatment solution; and the sulfonation treatment solution was subjected to sulfomethylation modification at 70° C. for 4 h to give hydrophilic lignosulfonate nanoparticles. In the sulfonation treatment solution, the activated alkali lignin nanoparticles had a mass concentration of 10 g/L, $Na_2SO_3$ had a mass fraction of 0.1%, and HCHO had a volume fraction of 0.2%. The hydrophilic lignosulfonate nanoparticles had a sulfonyl content of 1.20 mmol/g.

The hydrophilic lignosulfonate nanoparticles, 2-epoxypropyl dodecyl dimethyl ammonium chloride and i-propanol were mixed to give a chemical grafting treatment solution; the pH of the chemical grafting treatment solution was adjusted to 12 with a NaOH solution with a mass fraction of 20%; and the resulting mixture was heated to 50° C. in a microwave synthesizer, then reacted for 1 h, subjected to dialysis, and then subjected to lyophilization at −50° C. for 24 h to give an amphiphilic lignin nanomaterial. In the chemical grafting treatment solution, the hydrophilic lignosulfonate nanoparticles had a concentration of 10 g/L, and the 2-epoxypropyl dodecyl dimethyl ammonium chloride had a volume fraction of 0.2%. As measured by elemental analysis, the amphiphilic lignin nanomaterial had a N content of 2.0%.

An oil sludge detergent included the following components, in mass fraction: 0.1% of the obtained amphiphilic lignin nanomaterial, 0.02% of octylphenol polyoxyethylene ether, 0.5% of sodium chloride, and the balance of cleaning water.

The deoiling rate of the oil sludge detergent was tested according to the following steps:

step S1: the oil sludge was dried at 105° C. to constant weight, crushed, and then sieved through an 80-mesh sieve to give an oil sludge powder; and the oil sludge powder was weighed, and the obtained mass was recorded as $m_0$; and step S2: 100 g of the oil sludge powder was mixed with 100 g of the oil sludge detergent, and the pH was adjusted to 10; the resulting mixture was stirred at 70° C. for 60 min, and then centrifuged in a centrifuge at 2,000 rpm for 15 min to give oil, water and mud layers; the oil and water layers were removed; the lower sediment was dried to constant weight in an oven and then weighed, and the obtained mass was recorded as mi; and an equal mass of distilled water was set as the control group. The deoiling rate R % was calculated according to the following formula, and the results were shown in Table 1.

$$R = \frac{m_0 - m_1}{m_0}.$$

TABLE 1

Comparison of deoiling rates for oil sludge from an oil field in Xinjiang

| Washing liquid | Mass of oil sludge/g | | Deoiling rate/% |
| --- | --- | --- | --- |
| | $m_0$ (g) | $m_1$ (g) | R |
| Oil sludge detergent | 100.0 ± 0.1 | 40.2 ± 2.2 | 88 |
| Water | 100.0 ± 0.1 | 50.5 ± 1.5 | 48 |

The data in Table 1 show that adding a certain amount of oil sludge detergent during the process of washing oil sludge can significantly increase the deoiling rate, indicating that the amphiphilic lignin nanomaterial with a high surface activity can well bind to oil on the surface of mud, which achieves an excellent deoiling effect by reducing the interfacial tension.

Example 2

Hydrochloric acid or sulfuric acid was added to the bagasse soda pulping black liquor under stirring to adjust the pH of the solution to 3, and the resulting mixture was aged for 2 h and then centrifuged at 4,000 r/min for 20 min; the obtained solid was washed with water to neutral and then dried at 40° C.; and the dried solid was subjected to ball milling in a planetary ball mill to give alkali lignin particles with a particle size of 60 μm. The ball milling was conducted under the following parameters: mass fraction of filler in the ball milling tank: 24%; rotational speed of the ball mill: 425 r/min; ball milling time: 5 h; and ball-to-material ratio: 4:1.

The alkali lignin particles, a hydrogen peroxide solution (with a mass concentration of 30%) and deionized water were mixed to give an activation treatment solution; and the activation treatment solution was activated at 80° C. for 0.6 h, and then homogenized 6 times in a high-pressure microjet homogenizer under a pressure of 40 MPa to give activated alkali lignin nanoparticles with a diameter of 100 nm and a molecular weight of 2,200. In the activation treatment solution, the alkali lignin particles had a mass concentration of 10 g/L, and the hydrogen peroxide solution had a volume fraction of 0.3%.

The activated alkali lignin nanoparticles, $Na_2SO_3$, HCHO, and deionized water were mixed to give a sulfonation treatment solution; and the sulfonation treatment solution was subjected to sulfomethylation modification at 80° C. for 2 h to give hydrophilic lignosulfonate nanoparticles. In the sulfonation treatment solution, the activated alkali lignin nanoparticles had a mass concentration of 10 g/L, $Na_2SO_3$ had a mass fraction of 0.2%, and HCHO had a volume fraction of 0.3%. The hydrophilic lignosulfonate nanoparticles had a sulfonyl content of 1.86 mmol/g.

The hydrophilic lignosulfonate nanoparticles, 2-epoxypropyl dodecyl dimethyl ammonium chloride and i-propanol were mixed to give a chemical grafting treatment solution; the pH of the chemical grafting treatment solution was adjusted to 12 with a NaOH solution with a mass fraction of 20%; and the resulting mixture was heated to 60° C. in a microwave synthesizer, then reacted for 2 h, subjected to dialysis, and then subjected to lyophilization at −50° C. for 24 h to give an amphiphilic lignin nanomaterial. In the chemical grafting treatment solution, the hydrophilic lignosulfonate nanoparticles had a concentration of 10 g/L, and the 2-epoxypropyl dodecyl dimethyl ammonium chloride had a volume fraction of 1%. As measured by elemental analysis, the amphiphilic lignin nanomaterial had a N content of 4.2%.

An oil sludge detergent included the following components, in mass fraction: 0.1% of the obtained amphiphilic lignin nanomaterial, 0.02% of octylphenol polyoxyethylene ether, 0.5% of sodium chloride, and the balance of cleaning water.

The deoiling rate of the obtained oil sludge detergent was tested according to the method of Example 1, and the results were shown in Table 2.

TABLE 2

Comparison of deoiling rates for oil sludge from an oil field in Xinjiang

| Washing liquid | Mass of oil sludge/g | | Deoiling rate/% |
| --- | --- | --- | --- |
| | $m_0$ (g) | $m_1$ (g) | R |
| Oil sludge detergent | 100.0 ± 0.1 | 33.2 ± 1.8 | 95 |
| Water | 100.0 ± 0.1 | 50.5 ± 1.5 | 48 |

The data in Table 2 show that, as the diameter of the amphiphilic lignin nanomaterial decreases and the degree of substitution (DS) for surface functional groups increases, the surface activity of the amphiphilic lignin nanomaterial increases significantly, which is helpful to the removal of the oil component in oil sludge, resulting in further improvement of deoiling rate.

Example 3

Hydrochloric acid or sulfuric acid was added to the bagasse soda pulping black liquor under stirring to adjust the pH of the solution to 3, and the resulting mixture was aged for 2 h and then centrifuged at 4,000 r/min for 20 min; the obtained solid was washed with water to neutral and then dried at 40° C.; and the dried solid was subjected to ball milling in a planetary ball mill to give alkali lignin particles with a particle size of 30 The ball milling was conducted under the following parameters: volume fraction of filler in the ball milling tank: 22%; rotational speed of the ball mill: 480 r/min; ball milling time: 6 h; and ball-to-material ratio: 5:1.

The alkali lignin particles, a hydrogen peroxide solution (with a mass concentration of 30%) and deionized water were mixed to give an activation treatment solution; and the activation treatment solution was activated at 60° C. for 0.8 h, and then homogenized 6 times in a high-pressure microjet homogenizer under a pressure of 50 MPa to give activated alkali lignin nanoparticles with a diameter of 40 nm and a molecular weight of 1,700. In the activation treatment solution, the alkali lignin particles had a mass concentration of 10 g/L, and the hydrogen peroxide solution had a volume fraction of 0.5%.

The activated alkali lignin nanoparticles, $Na_2SO_3$, HCHO, and deionized water were mixed to give a sulfonation treatment solution; and the sulfonation treatment solution was subjected to sulfomethylation modification at 90° C. for 6 h to give hydrophilic lignosulfonate nanoparticles. In the sulfonation treatment solution, the activated alkali lignin nanoparticles had a mass concentration of 10 g/L, $Na_2SO_3$ had a mass fraction of 0.3%, and HCHO had a volume fraction of 0.4%. The hydrophilic lignosulfonate nanoparticles had a sulfonyl content of 2.41 mmol/g.

The hydrophilic lignosulfonate nanoparticles, 2-epoxypropyl dodecyl dimethyl ammonium chloride and i-propanol were mixed to give a chemical grafting treatment solution; the pH of the chemical grafting treatment solution was adjusted to 12 with a NaOH solution with a mass fraction of 20%; and the resulting mixture was heated to 60° C. in a microwave synthesizer, then reacted for 1 h, subjected to dialysis, and then subjected to lyophilization at −50° C. for 24 h to give an amphiphilic lignin nanomaterial. In the chemical grafting treatment solution, the hydrophilic lignosulfonate nanoparticles had a concentration of 10 g/L, and the 2-epoxypropyl dodecyl dimethyl ammonium chloride had a volume fraction of 0.5%. As measured by elemental analysis, the amphiphilic lignin nanomaterial had a N content of 3.5%.

An oil sludge detergent included the following components, in mass fraction: 0.1% of the obtained amphiphilic lignin nanomaterial, 0.02% of octylphenol polyoxyethylene ether, 0.5% of sodium chloride, and the balance of cleaning water.

The deoiling rate of the obtained oil sludge detergent was tested according to the method of Example 1, and the results were shown in Table 3.

TABLE 3

Comparison of deoiling rates for oil sludge from an oil field in Xinjiang

| Washing liquid | Mass of oil sludge/g | | Deoiling rate/% |
|---|---|---|---|
| | $m_0$ (g) | $m_1$ (g) | R |
| Oil sludge detergent | 100.0 ± 0.1 | 25.2 ± 2.8 | 92 |
| Water | 100.0 ± 0.1 | 50.5 ± 1.5 | 48 |

The data in Table 3 show that, as the diameter of the amphiphilic lignin nanomaterial decreases and the DS for surface functional groups increases, the surface activity of the amphiphilic lignin nanomaterial increases significantly, which is helpful to the removal of the oil component in oil sludge, resulting in further improvement of deoiling rate.

Example 4

Hydrochloric acid or sulfuric acid was added to the bagasse soda pulping black liquor under stirring to adjust the pH of the solution to 3, and the resulting mixture was aged for 2 h and then centrifuged at 4,000 r/min for 20 min; the obtained solid was washed with water to neutral and then dried at 40° C.; and the dried solid was subjected to ball milling in a planetary ball mill to give alkali lignin particles with a particle size of 10 μm. The ball milling was conducted under the following parameters: volume fraction of filler in the ball milling tank: 20%; rotational speed of the ball mill: 500 r/min; ball milling time: 8 h; and ball-to-material ratio: 6:1.

The alkali lignin particles, a hydrogen peroxide solution (with a mass concentration of 30%) and deionized water were mixed to give an activation treatment solution; and the activation treatment solution was activated at 70° C. for 0.4 h, and then homogenized 6 times in a high-pressure microjet homogenizer under a pressure of 50 MPa to give activated alkali lignin nanoparticles with a diameter of 20 nm and a molecular weight of 1,000. In the activation treatment solution, the alkali lignin particles had a mass concentration of 10 g/L, and the hydrogen peroxide solution had a volume fraction of 0.5%.

The activated alkali lignin nanoparticles, $Na_2SO_3$, HCHO, and deionized water were mixed to give a sulfonation treatment solution; and the sulfonation treatment solution was subjected to sulfomethylation modification at 100° C. for 4 h to give hydrophilic lignosulfonate nanoparticles. In the sulfonation treatment solution, the activated alkali lignin nanoparticles had a mass concentration of 10 g/L, $Na_2SO_3$ had a mass fraction of 0.4%, and HCHO had a volume fraction of 0.5%. The hydrophilic lignosulfonate nanoparticles had a sulfonyl content of 2.40 mmol/g.

The hydrophilic lignosulfonate nanoparticles, 2-epoxypropyl dodecyl dimethyl ammonium chloride and i-propanol were mixed to give a chemical grafting treatment solution; the pH of the chemical grafting treatment solution was adjusted to 12 with a NaOH solution with a mass fraction of 20%; and the resulting mixture was heated to 60° C. in a microwave synthesizer, then reacted for 1 h, subjected to dialysis, and then subjected to lyophilization at −50° C. for 24 h to give an amphiphilic lignin nanomaterial. In the chemical grafting treatment solution, the hydrophilic lignosulfonate nanoparticles had a concentration of 10 g/L, and the 2-epoxypropyl dodecyl dimethyl ammonium chloride had a volume fraction of 1.0%. As measured by elemental analysis, the amphiphilic lignin nanomaterial had a N content of 1.5%.

An oil sludge detergent included the following components, in mass fraction: 0.1% of the obtained amphiphilic lignin nanomaterial, 0.02% of octylphenol polyoxyethylene ether, 0.5% of sodium chloride, and the balance of cleaning water.

The deoiling rate of the obtained oil sludge detergent was tested according to the method of Example 1, and the results were shown in Table 4.

TABLE 4

Comparison of deoiling rates for oil sludge from an oil field in Xinjiang

| Washing liquid | Mass of oil sludge/g | | Deoiling rate/% |
|---|---|---|---|
| | $m_0$ (g) | $m_1$ (g) | R |
| Oil sludge detergent | 100.0 ± 0.1 | 20.2 ± 2.8 | 98 |
| Water | 100.0 ± 0.1 | 50.5 ± 1.5 | 48 |

The data in Table 4 show that, as the diameter of the amphiphilic lignin nanomaterial decreases and the DS for surface functional groups increases, the surface activity of the amphiphilic lignin nanomaterial increases significantly, which is helpful to the removal of the oil component in oil sludge, resulting in further improvement of deoiling rate.

The foregoing descriptions are merely preferred implementations of the disclosure rather than limitations on the disclosure in any form. It should be noted that a person of ordinary skill in the art may further make several improvements and modifications without departing from the principle of the disclosure, but such improvements and modifications should be deemed as falling within the protection scope of the disclosure.

What is claimed is:

1. A method for preparing an amphiphilic lignin nanomaterial based on pulping black liquor, comprising the following steps:
    subjecting pulping black liquor to acid precipitation, solid-liquid separation and ball milling to give alkali lignin particles;
    mixing the alkali lignin particles, a hydrogen peroxide solution and water to give an activation treatment solution; and subjecting the activation treatment solution sequentially to activation treatment and microjet homogenization treatment to give activated alkali lignin nanoparticles;
    mixing the activated alkali lignin nanoparticles, $Na_2SO_3$, HCHO and deionized water to give a sulfonation treatment solution, and subjecting the sulfonation treatment solution to sulfomethylation modification to give hydrophilic lignosulfonate nanoparticles; and
    mixing the hydrophilic lignosulfonate nanoparticles, long-chain alkylene oxide and i-propanol to give a chemical grafting treatment solution, and subjecting the chemical grafting treatment solution to chemical grafting to give an amphiphilic lignin nanomaterial.

2. The method according to claim 1, wherein, the pH for the acid precipitation is 2 to 3.

3. The method according to claim 1, wherein, the ball milling is conducted under the following parameters: volume fraction of filler in the ball milling tank: 20% to 25%; ball-to-material ratio: (3-6):1; rotational speed: 400 r/min to 500 r/min; and ball milling time: 4 h to 8 h.

4. The method according to claim 1, wherein, in the activation treatment solution, the alkali lignin particles have a mass concentration of 5 g/L to 10 g/L; the hydrogen peroxide solution with a mass concentration of 30% has a volume fraction of 0.2% to 0.5%; and the activation treatment is conducted at 55° C. to 65° C. for 0.2 h to 1 h.

5. The method according to claim 1, wherein, the microjet homogenization treatment is conducted under pressure of 30 MPa to 50 MPa.

6. The method according to claim 4, wherein, the microjet homogenization treatment is conducted under pressure of 30 MPa to 50 MPa.

7. The method according to claim 1, wherein, in the sulfonation treatment solution, $Na_2SO_3$ has a mass fraction of 0.1% to 0.4%; HCHO has a volume fraction of 0.2% to 0.5%; the activated alkali lignin nanoparticles have a mass concentration of 10 g/L; and the sulfomethylation modification is conducted at 70° C. to 120° C. for 1 h to 4 h.

8. The method according to claim 1, wherein, in the chemical grafting treatment solution, the hydrophilic lignosulfonate nanoparticles have a mass concentration of 10 g/L; the long-chain alkylene oxide has a volume fraction of 0.2% to 1.0%; and the long-chain alkylene oxide is 2-epoxypropyl dodecyl dimethyl ammonium chloride or 3-chloro-2-hydroxypropyl dimethyl octadecyl ammonium chloride.

9. The method according to claim 1, wherein, the chemical grafting is conducted at 50° C. to 60° C. for 1 h to 2 h, with a pH of 10 to 12.

10. The method according to claim 8, wherein, the chemical grafting is conducted at 50° C. to 60° C. for 1 h to 2 h, with a pH of 10 to 12.

11. An amphiphilic lignin nanomaterial obtained by the method according to claim 1, wherein, the amphiphilic lignin nanomaterial has a particle size of 20 nm to 100 nm.

12. An amphiphilic lignin nanomaterial obtained by the method according to claim 2, wherein, the amphiphilic lignin nanomaterial has a particle size of 20 nm to 100 nm.

13. An amphiphilic lignin nanomaterial obtained by the method according to claim 3, wherein, the amphiphilic lignin nanomaterial has a particle size of 20 nm to 100 nm.

14. An amphiphilic lignin nanomaterial obtained by the method according to claim 4, wherein, the amphiphilic lignin nanomaterial has a particle size of 20 nm to 100 nm.

15. An amphiphilic lignin nanomaterial obtained by the method according to claim 5, wherein, the amphiphilic lignin nanomaterial has a particle size of 20 nm to 100 nm.

16. An amphiphilic lignin nanomaterial obtained by the method according to claim 6, wherein, the amphiphilic lignin nanomaterial has a particle size of 20 nm to 100 nm.

17. An amphiphilic lignin nanomaterial obtained by the method according to claim 7, wherein, the amphiphilic lignin nanomaterial has a particle size of 20 nm to 100 nm.

18. An amphiphilic lignin nanomaterial obtained by the method according to claim 8, wherein, the amphiphilic lignin nanomaterial has a particle size of 20 nm to 100 nm.

19. An amphiphilic lignin nanomaterial obtained by the method according to claim 9, wherein, the amphiphilic lignin nanomaterial has a particle size of 20 nm to 100 nm.

20. An oil sludge detergent, comprising the following components, in mass percentage: 1% to 5% of the amphiphilic lignin nanomaterial according to claim 11, 0.2% to 2% of surfactant, 1% to 1.2% of inorganic salt, and the balance of water, wherein, the surfactant is octylphenol polyoxyethylene ether and/or nonylphenol polyoxyethylene ether; and the inorganic salt comprises one or more of sodium chloride, sodium carbonate and magnesium chloride.

\* \* \* \* \*